(12) United States Patent
Lidow

(10) Patent No.: US 10,817,906 B2
(45) Date of Patent: Oct. 27, 2020

(54) SYSTEMS AND TECHNIQUES FOR ALLOCATING AD SPACE INVENTORY

(71) Applicant: AppNexus, Inc., New York, NY (US)

(72) Inventor: Arel Ives Lidow, New York, NY (US)

(73) Assignee: Xandr Inc., New York, NY (US)

( * ) Notice: Subject to any disclaimer, the term of this patent is extended or adjusted under 35 U.S.C. 154(b) by 970 days.

(21) Appl. No.: 14/838,758

(22) Filed: Aug. 28, 2015

(65) Prior Publication Data

US 2017/0061495 A1  Mar. 2, 2017

(51) Int. Cl.
*G06Q 30/02* (2012.01)

(52) U.S. Cl.
CPC ..... *G06Q 30/0267* (2013.01); *G06Q 30/0275* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 10,528,986 B2 * | 1/2020 | Seljan | G06Q 30/0277 |
| 2008/0147497 A1 * | 6/2008 | Tischer | G06Q 30/0264 |
| | | | 705/14.61 |
| 2009/0234711 A1 * | 9/2009 | Ramer | G06F 17/30749 |
| | | | 705/14.66 |
| 2010/0262498 A1 * | 10/2010 | Nolet | G06Q 30/0251 |
| | | | 705/14.71 |
| 2011/0173126 A1 * | 7/2011 | Knapp | G06Q 20/3829 |
| | | | 705/71 |

(Continued)

FOREIGN PATENT DOCUMENTS

WO   WO-2014005018 A2 *  1/2014  ......... G06Q 30/0277

OTHER PUBLICATIONS

De Liu, Jianqing Chen, and Andrew B. Whinston. "Ex Ante Information and the Design of Keyword Auctions." Information Systems Research 21, No. 1 (Mar. 2010): 133-53. doi:10.1287/isre.1080.0225. (Year: 2010).*

(Continued)

*Primary Examiner* — Michael Bekerman
*Assistant Examiner* — Scott Snider
(74) *Attorney, Agent, or Firm* — Guntin & Gust, PLC; Andrew Gust

(57) ABSTRACT

Methods, systems, and apparatus, including computer programs encoded on a computer storage medium, for receiving bidder data identifying bidders for an instance of an advertising space and price data corresponding to prices offered by the bidders for the advertising space instance, identifying, based on the bidder data, line items matching the bidders, wherein the line items include dynamically alterable parameters, determining, based on the price data, values of the dynamically alterable parameters, selecting a line item from a plurality of line items, wherein the plurality of line items includes the identified line items, and wherein the selection of the line item is based on the values of the dynamically alterable parameters of the identified line items, obtaining creative data corresponding to the selected line item, and transmitting the creative data, wherein the creative data represent a creative compatible with the instance of the advertising space.

27 Claims, 3 Drawing Sheets

(56) References Cited

U.S. PATENT DOCUMENTS

| | | | |
|---|---|---|---|
| 2012/0005029 A1* | 1/2012 | Lang | G06Q 30/0275 705/14.71 |
| 2012/0310729 A1 | 12/2012 | Dalto et al. | |
| 2013/0080330 A1* | 3/2013 | Francis | G06Q 30/0275 705/50 |
| 2013/0268351 A1 | 10/2013 | Abraham et al. | |
| 2015/0051968 A1 | 2/2015 | Sotelo et al. | |
| 2015/0051986 A1* | 2/2015 | Saifee | G06Q 30/0275 705/14.71 |
| 2015/0348106 A1* | 12/2015 | Yao | G06Q 30/0261 705/14.54 |

OTHER PUBLICATIONS

U.S. Appl. No. 14/745,844, filed Jun. 22, 2015, Cost-Per-View and Cost Per-Impression Bids on a Single Impression, Lidow, et al.
U.S. Appl. No. 14/685,919, filed Apr. 14, 2015, Cost-Per-View Advertisement Bidding, Lidow.
U.S. Appl. No. 15/180,913, filed Jun. 23, 2016, Online Ad Auction Based on Predicted Ad Space View-Ability, Shah, et al.

* cited by examiner

US 10,817,906 B2

SYSTEMS AND TECHNIQUES FOR ALLOCATING AD SPACE INVENTORY

BACKGROUND

This specification relates generally to online advertising. In particular, some embodiments described herein relate to systems and techniques for allocating ad space inventory to advertisers or other buyers.

Some online display advertising systems deliver promotional messages to consumers by displaying visual advertisements in web pages or other electronic documents. A publisher of a web page can insert an ad space in a web page, and an advertisement ("ad") may be placed in the region of the web page corresponding to the ad space when the web page is displayed. For example, when the web page is displayed in a browser, a "creative" (e.g., a visual advertisement) of an advertiser can be dynamically retrieved from an ad server and displayed in the ad space. The act of serving a creative on a web page for displaying may be referred to as an "impression." The process of determining which creative to serve and display in a particular instance of an ad space may be referred to "allocating an instance of ad space inventory," "allocating ad space inventory," or "allocating an ad space."

A publisher's ad space inventory generally includes one or more ad spaces on web pages served by the publisher's web servers. Publisher can sell their ad space inventories to advertisers. In some cases, publishers agree with advertisers or other ad buyers in advance to reserve a portion of their ad space inventory for buyer's ad campaigns, and configure their ad servers to implement the terms of the agreement by allocating suitable ad space inventory to the advertiser's creatives. In some cases, one or more publishers and one or more advertisers can participate in auctions in which selling and buying of ad space inventories take place. Auctions can be conducted by an ad network or ad exchange that brokers between a group of publishers and a group of advertisers.

Selling and buying ad spaces can be based on pricing or payment models such as cost per thousand impressions (CPM), cost per click (CPC), and cost per action or acquisition (CPA). In the CPM model, advertisers typically pay for every impression of their advertisement; the price paid for each impression is measured in price per 1000 ("mille") impressions. In the CPC model, advertisers typically pay each time a viewer clicks on their advertisement. In the CPA model, advertisers pay for every action, such as a sale or registration, completed as a result of a viewer clicking on their advertisement.

SUMMARY

In general, one aspect of the subject matter described in this specification can be embodied in methods that include the actions of receiving bid data from a device, the bid data including bidder data identifying bidders for an instance of an advertising space and price data corresponding to prices offered by the respective bidders for the instance of the advertising space, identifying, based at least in part on the bidder data, line items matching the respective bidders, wherein the line items include respective dynamically alterable parameters, determining, based at least in part on the price data, values of the dynamically alterable parameters of the respective line items matching the respective bidders for the instance of the advertising space, selecting a first line item from a plurality of line items, wherein the plurality of line items includes the identified line items, and wherein the selection of the first line item is based at least in part on the values of the dynamically alterable parameters of the identified line items, obtaining creative data corresponding to the first line item and to a bidder matching the first line item, and transmitting the creative data to the device, wherein the creative data represent a creative compatible with the instance of the advertising space.

These and other aspects can optionally include one or more of the following features. In some embodiments, the actions may further include receiving, from a second device, second bid data of the same bidders for a second instance of the advertising space, identifying the same line items matching the respective bidders, determining second values of the parameters of the line items based at least in part on the second bid data, selecting a second of the identified line items based at least in part on the second values of the parameters of the identified line items, and transmitting, to the second device, second creative data representing a second creative corresponding to the second line item and to a second bidder matching the second line item.

In some embodiments, the actions may further include receiving second bid data from a second device, the second bid data including bidder data identifying the bidders and second price data corresponding to second prices offered by the respective bidders for a second instance of the advertising space, identifying, based at least in part on the second bidder data, the line items matching the respective bidders, determining, based at least in part on the second price data, second values of the dynamically alterable parameters of the respective line items matching the respective bidders for the second instance of the advertising space, selecting a second line item from a second plurality of line items, wherein the second plurality of line items includes the identified line items, and wherein the selection of the second line item is based at least in part on the second values of the dynamically alterable parameters of the identified line items, obtaining second creative data corresponding to the second line item and to a second bidder matching the second line item, and transmitting the second creative data to the device, wherein the second creative data represent a second creative compatible with the second instance of the advertising space.

In some embodiments, the bid data are derived, at least in part, from a client-side auction performed during loading of an HTML file by the device. In some embodiments, receiving the bid data comprises receiving the bid data prior to identifying the plurality of line items, and wherein each of the plurality of line items matches the instance of the advertising space. In some embodiments, the dynamically alterable parameters of the respective line items comprise price parameters representing the prices offered by the respective bidders for the instance of the advertising space. In some embodiments, the dynamically alterable parameters of the respective line items comprise priority parameters representing priorities of the respective line items. In some embodiments, receiving the bid data comprises receiving a uniform resource locator (URL) comprising the bid data. In some embodiments, the URL comprises a query string, and wherein the query string comprises the bid data. In some embodiments, transmitting the creative data to the device comprises transmitting the creative or a location of the creative to the device. In some embodiments, the location of the creative is represented by a URL. In some embodiments, the line items include the respective dynamically alterable parameters. In some embodiments, the device is a mobile device.

Another aspect of the subject matter described in this specification can be embodied in a system, comprising a display device and a data-processing device programmed to display, on the display device, a user interface for configuring a line item of an ad server, wherein the line item represents a purchase order for an instance of an advertising space managed by the ad server, and wherein the user interface includes an input element configured to receive input identifying a purchaser associated with the line item, and an input element configured to receive input indicating that a price parameter of the line item is dynamically alterable, wherein the price parameter represents a price offered by the purchaser for an instance of an advertising space.

In some embodiments, the user interface further includes an input element configured to receive input indicating that a priority parameter of the line item is dynamically alterable, wherein the priority parameter represents a priority of the line relative to one or more other line items. In some embodiments, the user interface further includes an input element configured to receive input identifying one or more sets of dimensions for advertising spaces matching the line item. In some embodiments, the user interface further includes an input element configured to receive input specifying one or more targeting criteria for instances of advertising spaces matching the line item. In some embodiments, the system further comprises a storage medium, wherein the data-processing device is further programmed to store the line item in a database on the storage medium.

Particular embodiments of the subject matter described in this specification can be implemented to realize one or more of the following advantages. Pre-bidding for an ad space may be implemented using a pre-bid line item with a dynamic price parameter. In some embodiments, the system uses a single pre-bid line item to match any bid by a particular bidder in a client-side auction for an ad space, rather than using one conventional line item for each bid price available to the bidder. In some embodiments, a pre-bid line item can have different price parameter values, depending on the values of a bidder's pre-bids. In some embodiments, the pre-bid line item is backward compatible with conventional line items. In some embodiments, the pre-bid line item enhances a publisher's ad revenue by improving the efficiency of the market for ad space inventory. In some embodiments, the pre-bid line item reduces the time required for programmers to create and maintain line items for pre-bidding partners. In some embodiments, the use of the pre-bid line items reduces the amount of storage and/or the amount of processing resources used to implement pre-bidding.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
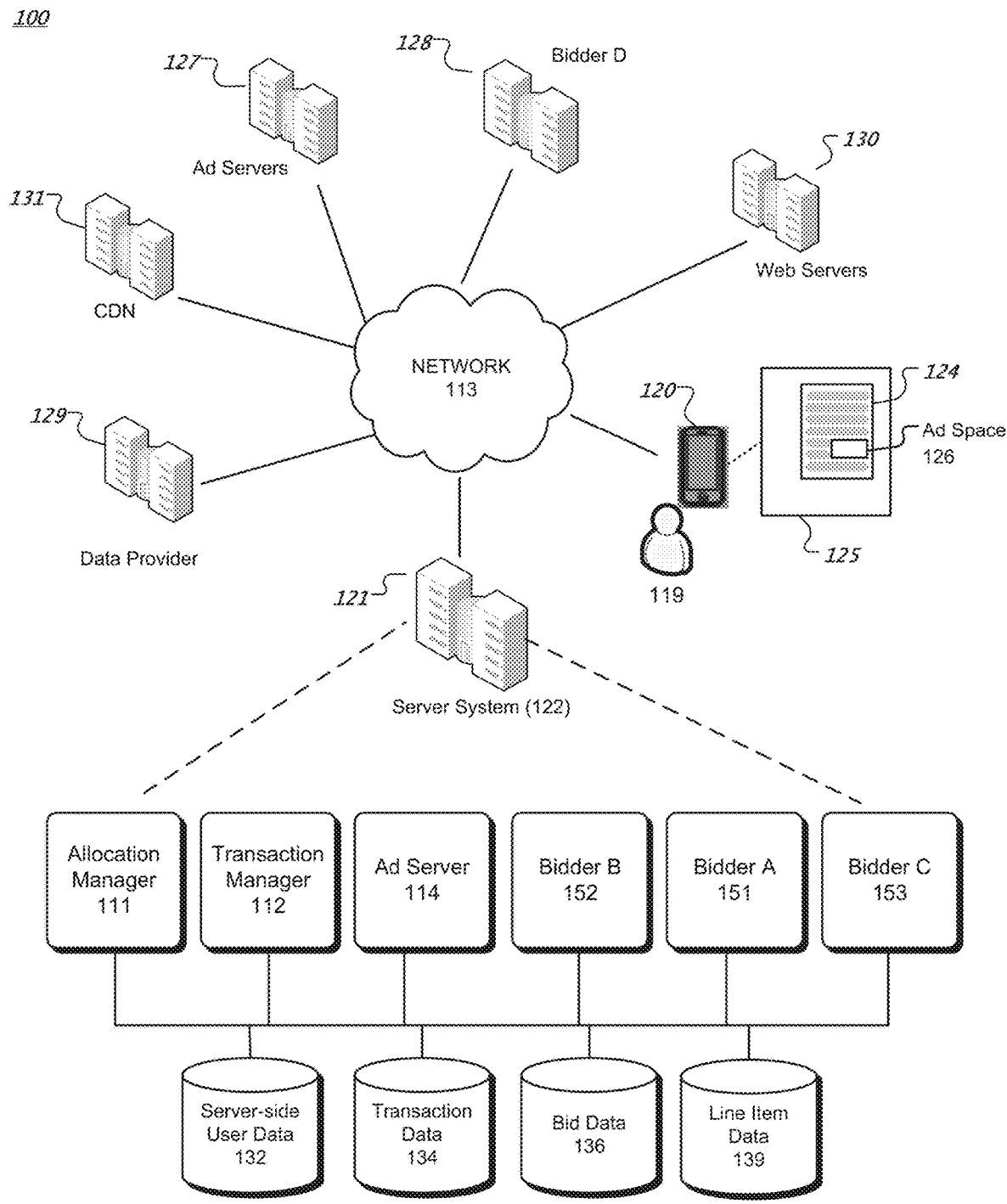
FIG. 1 is a block diagram of a system for online advertising, according to some embodiments.

Historically, publishers have allocated portions of their ad space inventory to buyers (e.g., advertisers or ad networks) for the buyers' ad campaigns ("direct" ad campaigns or "programmatic" ad campaigns) through offline agreements. For example, a publisher can allocate 20% of the ad space inventory on a website's landing page during a specified week or month to one advertiser for an ad campaign, allocate 15% of the ad space inventory on the landing page during the same week or month to another advertiser for another ad campaign, and allocate another 15% of the ad space inventory on the landing page during the same week or month to an ad network for the ad campaigns of the ad network's clients. The terms of such agreements can include the payment model and pricing for the ad space inventory, the desired pacing of the ad campaign (e.g., the time rate at which the publisher's ad spaces are allocated to the ad campaign), targeting parameters (e.g., preferences or limits on which instances of ad space inventory can be allocated to an ad campaign, based on data associated with the ad space inventory), priority of the ad campaign relative to cotemporaneous ad campaigns on the publisher's site, etc.

Such agreements are generally implemented and enforced by an allocation management module associated with (e.g., executing on) the publisher's ad server. To implement and enforce the terms of such agreements, the allocation management module generally uses "line items" and prioritization rules. When a request to fill an available ad space is received, the allocation management module compares the characteristics of the ad space to the parameters of line items representing the publisher's agreements with buyers. If more than one line item matches the ad request (indicating that more than one creative or ad campaign may be eligible to fill the ad space), the allocation management module applies the prioritization rules to determine which ad campaign or creative fills the ad space.

Thus, line items have historically been used to allocate a seller's ad space inventory among buyers in ways that are consistent with the terms of agreements between the seller and the buyers, including terms relating to targeting, pacing, prioritization, number of impressions, and budget constraints. Since line items have historically implemented terms of agreements reached in advance of starting an ad campaign, the values of parameters of conventional line items (e.g., the values of price and prioritization parameters) have been set by programmers prior to initiating the ad campaign, and have remained constant throughout the ad campaign.

Historically, some publishers have made some ad space inventory available to real-time bidders via server-side auctions. For example, if a publisher's allocation management module determines that no line items match an ad request, the allocation management module can forward the request to an ad exchange, which can offer the ad space to bidders in a server-side auction. The ad space is then allocated to the winning bidder, and the system serves a creative provided by the winning bidder to fill the ad space.

In recent years, some buyers and sellers of ad space inventory have become dissatisfied with the conventional practice of allocating some ad space inventory based on offline agreements before making the remaining inventory available to real-time bidders. This conventional practice can result in publishers allocating very valuable ad spaces to ad campaigns at below-market prices, which depresses the publishers' revenue and limits real-time bidders' access to valuable ad space inventory.

To address these concerns, some publishers have implemented client-side auctions, which can take place prior to allocating ad space inventory to the ad campaigns of the publishers' direct or programmatic partners. Such client-side auctions are sometimes referred to as "pre-bidding," "header bidding," "advance bidding," "header tags," or "tagless bidding." When an instance of an ad space is available to fill (e.g., when a browser begins to load a web page with an ad space), a system can initiate a client-side auction by requesting bids from pre-bidding partners. Auction data describing the results of the client-side auction (e.g., the identity, bid price, and creative of the winning bidder, or the identities, bid prices, and creatives of multiple bidders) are then provided to the allocation management module, which uses the auction data to determine how to allocate the ad space.

For example, the allocation management module can use the winning bid price as an estimate of the value of the ad space. Rather than simply allocating the ad space to the ad campaign corresponding to the highest-priority line item that matches the ad request, the allocation management module can determine whether the prices corresponding to the matching line items are greater than or less than the estimated value of the ad space. If the prices corresponding to the matching line items are less than the estimated value of the ad space, the allocation management module can, in some cases, allocate the ad space to the winner of the client-side auction, or solicit bids from real-time bidders through a server-side auction. In this way, pre-bidding can limit the extent to which the publisher's direct and programmatic partners are able to purchase valuable ad inventory at below-market prices, and allow real-time bidders to compete for more valuable ad inventory. Nevertheless, the allocation management module is generally configured to allocate sufficient ad inventory to direct and programmatic partners to satisfy the terms of their agreements, even in cases where doing so allows such partners to purchase valuable ad spaces at below-market prices.

Systems that implement pre-bidding generally use conventional line items to integrate the results of the client-side auction into the allocation management module's process for allocating ad space inventory. In particular, programmers can create a collection of line items for each potential participant in the system's client-side auctions. The collection of line items for a pre-bidding partner includes one line item for each price or "price bucket" (e.g., a value representing a corresponding range of prices) that the pre-bidding partner can bid for an ad space. When a bid for an ad space is received from a pre-bid partner, the allocation management module searches for a line item with a "buyer identity" parameter that matches the identity of the pre-bid partner and a "price" (or "price bucket") parameter that matches the value of the partner's bid. In this way, the dynamically variable value of each pre-bid partner's bid is matched to a line item with a static price or price bucket parameter having the same value. The allocation management module then determines whether to allocate the ad space to an ad campaign, allocate the ad space to a pre-bidder, or initiate a server-side auction. This determination can be made by applying the allocation management module's prioritization rules to the pre-bid line items that match the pre-bid(s) and the ad campaign line items that match the ad request.

The inventors have recognized and appreciated that conventional techniques for integrating pre-bidding, direct or programmatic ad campaigns, and server-side auctions can be inefficient. In a system that supports pre-bidding, each pre-bidding partner's collection of conventional pre-bid line items can easily include hundreds or even thousands of line items. The sheer number of conventional pre-bid line items used to support even a small number of pre-bidding partners yields at least three types of inefficiencies. First, creating and maintaining a line item is a time-consuming, manual process. The amount of time required for programmers to create and maintain a large number of conventional pre-bid line items is significant. Second, the amount of computer-readable storage occupied by thousands or tens of thousands of pre-bid line items is excessive. Third, processing thousands or tens of thousands of pre-bid line items can occupy substantial processing resources.

The inventors have also recognized and appreciated that conventional techniques for integrating pre-bidding, direct or programmatic ad campaigns, and server-side auctions can interfere with the proper functioning of the market for online advertising. Allocation management modules generally impose limits on the total number of line items supported by the system (e.g., to limit the inefficiencies described above). To keep the total number of line items within the prescribed limits, the system may limit the number of pre-bidding partners and/or mandate the use of "price buckets." However, artificially limiting the number of pre-bidding partners can lead to inefficient allocation of ad space inventory. Furthermore, using price buckets introduces inaccuracies into the process of determining an ad space's value, which can also lead to inefficient allocation of ad space inventory.

For example, rather than creating ten line items for a pre-bidding partner's potential bids of $1.95, $1.96, $1.97, $1.98, $1.99, $2.00, $2.01, $2.02, $2.03, and $2.04, a programmer can create a single line item with a price bucket of $2.00. The pre-bidding partner is then restricted to bidding $2.00 in situations where the pre-bidding partner values an ad space at a price between $1.95 and $2.04, or otherwise wishes to place a bid in the range of $1.95-$2.04. If one pre-bidding partner values an ad space at $1.95 and another pre-bidding partner values the same ad space at $2.04, but both bids match $2.00 price buckets, the use of price buckets can result in the allocation management module incorrectly estimating the ad space's value to be $2.00, and incorrectly determining that the two pre-bidding partners value the ad space equally. Such inaccuracies can reduce the publisher's revenue and lead to inefficient allocation of the publisher's inventory.

The inventors have further recognized and appreciated that the problems associated with conventional implementations of pre-bidding can be alleviated or eliminated by using a line item with dynamic parameter values (e.g., dynamic price parameter values and/or dynamic priority parameter values). Whereas conventional line items with static parameter values may be well-suited for the task of allocating ad space inventory among ad campaigns in situations where the terms of the agreement between the advertiser and the publisher are established long before the ad campaign begins, such line items are not well-suited to the task of estimating the real-time value of an ad space based on auction data, nor to the task of allocating ad space inventory to real-time bidders, because the latter two tasks arise in scenarios where the price that the buyer is willing to pay for the ad space is not known until a very short time (e.g., 100 ms) before the ad space is allocated and filled.

According to an aspect of the present disclosure, a line item with one or more dynamic parameters is provided. The dynamic parameter(s) can include, for example, the line item's price parameter. In some embodiments, the value of dynamic line item parameter is determined based on data received by an allocation management module. Such data can be embedded, for example, in a uniform resource locator (URL) (e.g., as a key value in a query string portion of the URL). In some embodiments, the data includes an indication of the value of an ad space. The indication of value can be, for example, a price offered for the ad space by a potential purchaser (e.g., a bid offered for the ad space by a bidder). The indication of value can be expressed as a number or encoded in some other way.

According to another aspect of the present disclosure, an ad space inventory allocation system is provided. The system can use the dynamic parameter(s) of the line items to allocate portions of a seller's ad space inventory among prospective buyers. In some embodiments, the system uses the dynamic parameter(s) of the line items to represent the results of pre-bidding, and allocates instances of ad spaces among pre-bidders, ad campaigns, and server-side bidders based, at least in part, on those line items.

Some embodiments of the ad space inventory allocation system disclosed herein have one or more advantages over conventional ad space inventory allocation systems. In some embodiments, the system uses a single "pre-bid line item" to match any bid by a particular bidder in a client-side auction for an ad space, rather than using one conventional line item for each bid price available to the bidder. In some embodiments, a pre-bid line item can have a different price parameter value or priority parameter value, depending on the value of the matching pre-bid. In some embodiments, the pre-bid line item is backward compatible with conventional line items. In some embodiments, the pre-bid line item enhances a publisher's ad revenue by improving the efficiency of the market for ad space inventory. In some embodiments, the pre-bid line item reduces the time required for programmers to create and maintain line items for pre-bidding partners. In some embodiments, the use of pre-bid line items reduces the amount of storage and/or the amount of processing resources used to implement pre-bidding. The reduction in the amount of storage used to store line items can be between one and three orders of magnitude.

FIG. 1 illustrates an online advertising system 100, according to some embodiments. In advertising system 100, a server system 122 provides functionality for allocating ad space inventory. In some embodiments, server system 122 also provides functionality for real-time ad space data packaging and auctions. The server system 122 comprises modules (e.g., hardware components, software components, databases, etc.) that can be deployed at one or more data centers 121 in one or more geographic locations, for example. The server system 122 modules comprise an allocation manager 111, a transaction manager 112, ad server 114, and one or more bidders (e.g., bidder A 151, bidder B 152, and bidder C 153). The server system 122 can also include one or more modules for load balancing tools and/or security tools. The load balancing tools manage traffic within a single data center or between multiple data centers. The security tools manage data protection and access privilege for tenants served by the data centers 121. The modules can comprise components that can execute on the same or on different individual data processing apparatus. The server system 122 databases comprise a server-side user data database 132, transaction data database 134, bid data database 136, and line item data database 139. The databases can reside in one or more physical storage systems. The server system modules will be further described below.

By way of illustration, a graphical user interface 124 of a software application 125 executing on client device 120 of a user 119 can include an ad space 126 and a corresponding ad tag. The application 125 can be a web browser application, or a software application such as a game application or a maps application. The application 125 can retrieve content presented via the user interface 124 (e.g., a web page) through one or more data communication networks 113 (e.g., the Internet) from, for example, web servers 130 of a publisher. For instance, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are possible. Here, the client device 120 can be a mobile phone, a smartphone, a smart watch, a tablet computer, a personal computer (e.g., laptop computer, desktop computer, etc.), a game console, or an in-car media system. Other examples of a client device are possible. The application 125 can be a web browser, a mobile app, a streaming video application, or a gaming application. Other examples of applications 125 are possible.

In some implementations, an ad tag comprises an address (e.g., Uniform Resource Locator (URL)) of a device or system from which an ad will be requested (e.g., a URL for the server system 122), statements (e.g., Hypertext Markup Language (HTML) statements) for retrieving and displaying a creative, and/or instructions (e.g., JavaScript instructions) for retrieving and displaying a creative (e.g., displaying the creative in a frame, for example a 160 pixel×600 pixel iframe). Executing the ad tag causes the application 125 to send (e.g., through the networks 113) an ad request to the addressed device or system (e.g., to server system 122). In some implementations, the application 125 sends an ad request to the server system 122 via another advertising server system such as an ad exchange. The ad request can include information about the available ad space 126 (e.g., a size for the ad space, an identifier for the publisher), user information (e.g., an identifier of the user 119, data describing the user 119, an Internet Protocol or IP address of the device 120, etc.), and/or system information (e.g., types of the browser and the client device), for example. The ad request can be composed in JavaScript Object Notation (JSON) or Extensible Markup Language (XML) format and transmitted to the server system 122 using Hypertext Transfer Protocol (HTTP) protocol (e.g., using HTTP POST request method). Other ad request formats and transmission methods are possible.

The allocation manager 111 allocates portions of a seller's ad space inventory to buyers. Here, an ad space inventory can include one or more ad spaces on web pages served by a publisher's web site. Alternatively or in addition, an ad space inventory can include one or more ad spaces in user interfaces presented by a software application published by a publisher. Other collections of ad spaces in an ad space inventory are possible. A buyer can be an advertiser (e.g., a credit card company, a sportswear company), an ad network, an ad exchange, or an advertising agency, for example. Other buyers are possible. A seller can be a publisher (e.g., newspaper or social network), an online streaming or gaming service, an ad exchange, or an ad network. Other sellers are possible.

The allocation manager 111 processes ad requests received from applications 125 (e.g., web browsers or other applications displaying content from publishers) executing on client devices 120, allocates the ad space inventory referenced by the ad requests to buyers (e.g., based on agreements between buyers and the seller of the ad space inventory, based on the results of auctions, etc.), sends relevant information to advertisers, returns creatives to the browsers or other applications, keeps track of billing and usage for advertisers and publishers, and/or enforces quality standards, for example.

A seller can negotiate with a buyer and reach an agreement on pricing or other terms for running an ad campaign on ad space inventory available from the seller. The seller or the buyer can create (e.g., through an API or a web page provided by the server system 122) one or more line items (e.g., implemented as data objects) representing the terms of the agreement and store the line items in the line item data database 139. Such line items can be referred to as "ad campaign line items."

Alternatively or in addition, a prospective buyer can use pre-bidding techniques to place bids on an instance of ad space (e.g., during a client-side auction that takes place before the application 125 executing on the client device 120 sends the ad request to the server system 122). The seller or bidders can create (e.g., through an API or a web page provided by the server system 122) one or more line items (e.g., implemented as data objects) representing the bidders' pre-bids. Such line items can be referred to as "pre-bid line items."

A line item's parameters can include, without limitation, an identifier of a seller, an identifier of a buyer, identifiers of one or more ad spaces from the seller's ad space inventory, ad tags of one or creatives from the buyer's ad campaign, and/or a price for filling an instance of an ad space with a creative from the buyer's ad campaign. For ad campaign line items, the value of the price parameter can be a static price based on the terms of the agreement between the buyer and seller. For pre-bid line items, the value of the price parameter can be dynamic, and can be determined based on the buyer's pre-bid. A line item can also include flight dates (start and ending dates for the ad campaign) and one or more user target segments.

The allocation manager 111 can use the line items to allocate the ad space inventory among ad campaigns and pre-bidders. When the allocation manager 111 receives a request to fill an instance of an ad space, the allocation manager compares data associated with the instance of the ad space to the parameters of the line items in the line item data database 139. If no line items match the ad request, the allocation manager 111 can send a request to transaction manager 112 to conduct a server-side auction for the ad space. If more than one line item matches the ad request, the allocation manager 111 determines how to allocate the ad space (e.g., based on one or more line item prioritization rules). Identifying multiple matching line items for an ad request can indicate, for example, that more than one ad campaign is eligible to fill the ad space, or that multiple bidders placed pre-bids for the ad space, or that at least one ad campaign is eligible to fill the ad space and at least one bidder placed a pre-bid for the ad space.

Data associated with the instance of the ad space 126 can provide targeting information for buyers of the ad space 126, and can potentially command higher bid prices from bidders because of the targeting information. For instance, a grocery store advertiser may be willing to bid more on the ad space 126 if the user 119 is known for interests in food related topics (e.g., the user 119 has registered with a food website). As another example, a sporting goods advertiser may be more likely to bid more on the ad space 126 if the ad space 126 is part of a web page including a sports news article.

Data associated with the instance of the ad space 126 can include data associated with the user 119 (e.g., user segment data and/or user behavioral data). User segment data include demographic information, for example, age, gender, location, school, and occupation. Other user segment data are possible. User behavioral data can include data associated with a user's online activities, for example, that the user put a toy in a shopping cart, the user searched for a toy, the user visited an online toy store yesterday, and a frequency the user searched for a toy. Other user behavioral data are possible. Data associated with the instance of the ad space 126 can include contextual data. For instance, contextual data can include the type of the user interface 124 (e.g., a home page, a user interface of a game application, etc.), structure of the user interface 124 (e.g., a number of ads on the user interface 124), content of the user interface 124 (e.g., game, finance, sports, travel, content not suitable for children), an identifier of the ad space, the dimensions of the ad space, and/or timing data (e.g., the current month, day of the week, date, and/or time). Other contextual data are possible.

User segment data (e.g., demographic information) can be provided by a user to a publisher when the user accesses websites or applications published by the publisher. Some user segment data (e.g., location) can be determined by data associated with the user's client device (e.g., client device 120), for example, an Internet Protocol (IP) address associated with the client device. User behavioral data can be collected by an application (e.g., application 125) executed on a user's client device (e.g., client device 120). Contextual data can be determined by analyzing content (e.g., words, semantics) presented in the user interface, transmitted to the server system 122 with the ad request, or obtained using any other suitable technique.

A buyer (or a seller) can acquire data associated with an ad space from the ad space's publisher or from a data provider (e.g., Proximic of Palo Alto, Calif.). In various implementations, the buyer (or the seller) can store user data in the server-side user data database 132. For instance, the buyer can store in the server-side user data database 132 mappings between user identifiers and user segments.

In some embodiments, the allocation manager 111 implements allocation policies designed to enhance the seller's revenue while also adhering to the terms of the seller's ad campaign agreements. For example, when an ad campaign line item and a pre-bid line item match an ad request, and the pre-bid line item's price for the ad space exceeds the ad campaign line item's price, the allocation manager 111 can allocate the ad space to the pre-bidder, rather than the ad campaign partner. On the other hand, if allocating the ad space to the pre-bidder would jeopardize the system's ability to meet the terms of its agreement with the ad campaign partner, the allocation manager 111 can allocate the ad space to the ad campaign partner, even though the ad campaign line item's price is lower than the pre-bid line item's price.

More generally, the allocation manager 111 can select one of the matching line items to fill the ad space based on any suitable information, including, without limitation, one or more prioritization rules, the line items' parameters (e.g., the price parameters), the terms of ad campaign agreements (e.g., the number of ad spaces to be allocated to the ad campaign, the target pace of the ad campaign, etc.), and the status of current ad campaigns (e.g., the number of ad spaces that have been filled with ads from the ad campaign, the current pace of the ad campaign, etc.). In some embodiments, line items include priority parameters. The value of a priority parameter may represent a priority rank or a priority tier of the line item. The allocation manager 111 can select a line item to fill an ad space based, at least in part, on the priority parameters of the matching line items.

In some embodiments, the allocation manager 111 can dynamically set the values of one or more parameters of a line item. The allocation manager 111 can set a line item parameter's value after receiving an ad request but before searching the line item data database 139 for line items matching the ad request, after identifying line items matching the ad request, in response to receiving an instruction to set the line item parameter's value, or at any other suitable time. The allocation manager 111 can set a line item's parameter value based on data received from the software application 125 executing on the client device 120 (e.g., the ad request, a uniform resource locator (URL), a query string of a URL, a key value in query string of a URL, etc.) or any other suitable data.

In some embodiments, the allocation manager 111 dynamically sets the value(s) of the price and/or priority parameters of a pre-bid line item based on a URL associated with an ad request (e.g., the URL of the ad tag used to initiate the ad request). To fill and ad space, a client device 120 can conduct a client-side auction before sending the ad request to the allocation manager 111. During the client-side auction, the client device 120 can receive one or more pre-bids for the ad space from one or more pre-bidding partners. The client device 120 can send the pre-bids to the allocation manager 111 by adding data indicative of the pre-bids to a URL (e.g., a URL that the software application 125 calls to send an ad request to server system 122). For example, for each pre-bid, the client device 120 can add data identifying the pre-bidder (a "pre-bidder identifier") and data indicating the price of the pre-bid (a "pre-bid value") to the query string of the URL. In some embodiments, the pre-bidder identifier and pre-bid value for each pre-bid are encoded as key-value pairs in the URL's query string. After the software application 125 calls the URL to send the ad request to the server system 122, the allocation manager 111 can parse the URL's query string to determine the pre-bidder identifier and the pre-bid value for each pre-bid. The allocation manager 111 can then use this information to determine the price of each pre-bid, and to set the price parameter of each pre-bidder's pre-bid line item to match the price of the corresponding pre-bidder's pre-bid.

Optionally, the allocation manager can also receive creative data from client device 120 for the pre-bids. Each pre-bid's creative data (e.g., a URL from which the bidder's creative can be retrieved) can be added to the query string along with the corresponding pre-bidder identifier and the pre-bid value. A pre-bid's creative data can be used to serve the corresponding creative if the ad space is allocated to the pre-bid.

For some ad requests, the server system 122 can allocate the ad space to a buyer without conducting a server-side auction. In cases where no line item matches the ad request, or in cases where one or more line items match the ad request but the allocation manager decides to conduct a server-side auction before allocating the ad space, the allocation manager 111 can send an auction request to the transaction manager 112 to initiate a server-side auction for the ad space.

The transaction manager 112 ("impression bus" or simply "Imp Bus") implements an auction system that facilitates transactional aspects of ad space inventory and impression trading between buyers and sellers. The transaction manager 112 processes requests to auction ad spaces ("auction requests") received from the allocation manager 111, conducts auctions (e.g., on behalf of sellers), returns creatives to the allocation manager 111 or the software application 125 executing on the client device 120, and/or returns auction-result data, for example. The transaction manager 112 stores in the transaction data database 134 various transaction information for each ad space that is transacted by the transaction manager 112 or other modules of the server system 122.

A bidder system or bidder (e.g., bidder A 151) performs bidding operations on behalf of a buyer. The bidder takes various pieces of bid-specific information (e.g., maximal bid price, target user areas or segments, start and end dates, budget) as input and generates a bid for a particular instance of an ad space inventory, for example. A buyer can set up (e.g., through an API or web pages provided by the server system 122) a campaign targeting an ad space inventory with a set of bid-specific information for the ad space inventory and store the bid-specific information in bid data database 136. In some implementations, a bidder can be remote from the server system 122, such as bidder D 128.

The transaction manager 112 conducts an auction when an auction request for filling an available ad space is received from the allocation manager 111. In response to receiving the auction request from allocation manager 111, the transaction manager 112 generates a bid request including information about the ad space, the user, and so on, and sends the bid request to multiple bidders such as bidder A 151 and bidder B 152. The transaction manager 112 can also send the bid request through the networks 113 to servers of bidder D 128, which is external to the server system 122. The bid request can be composed in JSON format and sent to bidders using HTTP POST. The bid request can also be encoded or compressed. Other bid request formats and transmission methods are possible. The winning bid price can be the highest bid price, or a second highest bid price of the auction as determined by Vickrey auction or other second-price auction mechanisms.

Each bidder can determine an appropriate bid based on its own requirements (e.g., budget, targets in placements) and submit a bid response including a bid price and an identifier of a creative to be served, for example, to the transaction manager 112 (or not to respond at all). The transaction manager 112 determines a winning bid (e.g., a highest bid) among bid responses received within a specified time period (e.g., 100 milliseconds). The transaction manager 112 then returns a creative associated with the winning bid or a URL for a creative associated with the winning bid to the allocation manager 111.

After the allocation manager 111 has allocated the ad space (e.g., to a pre-bidder corresponding to a pre-bid line item that matches the ad request, to an ad campaign corresponding to an ad campaign line item that matches the ad request, or to the winner of the server-side auction for the ad space), the allocation manager 111 can send a creative associated with the selected line item or winning bidder to the client device 120, causing the application 125 to display the creative in the ad space in the user interface 124. In some embodiments, the allocation manager 111 sends the client device 120 a URL for a creative associated with the selected line item or winning bidder, causing the application 125 on the client device 120 to retrieve the creative from an ad server (e.g., ad server 114, or ad servers 127 external to the server system 122), or from servers of a content distribution network (CDN) 131. For ad campaign line items, the creatives or URLs of the creatives associated with the line items can be provided by the buyer when the line items are created (e.g., through an API or a web page provided by the server system 122). For pre-bid line items, the creatives or URLs of the creatives associated with the line items can be provided by the pre-bidders along with their pre-bids, and can be transmitted to the allocation manager 111 with the pre-bids. For example, the URL of a creative can be inserted in the ad tag query string.

The ad server 114 can serve creatives to web browsers or other applications. The ad server 114 can also make decisions about which creatives to serve, and track clicks or other user interactions with creatives, for example. A creative can be a visual or audio advertisement such as an image, an animation, a video clip, or an audio clip. Other types of a creative are possible.

In various implementations, the allocation manager 111 can store in the transaction data database 134 transaction information such as an identifier of the creative served to the ad space, an identifier of the buyer, the user's identifier, the price of the ad space, an identifier of the ad space, an identifier of the seller of the ad space, and/or a time stamp. Other transaction information of a transaction is possible.

Figure 2:
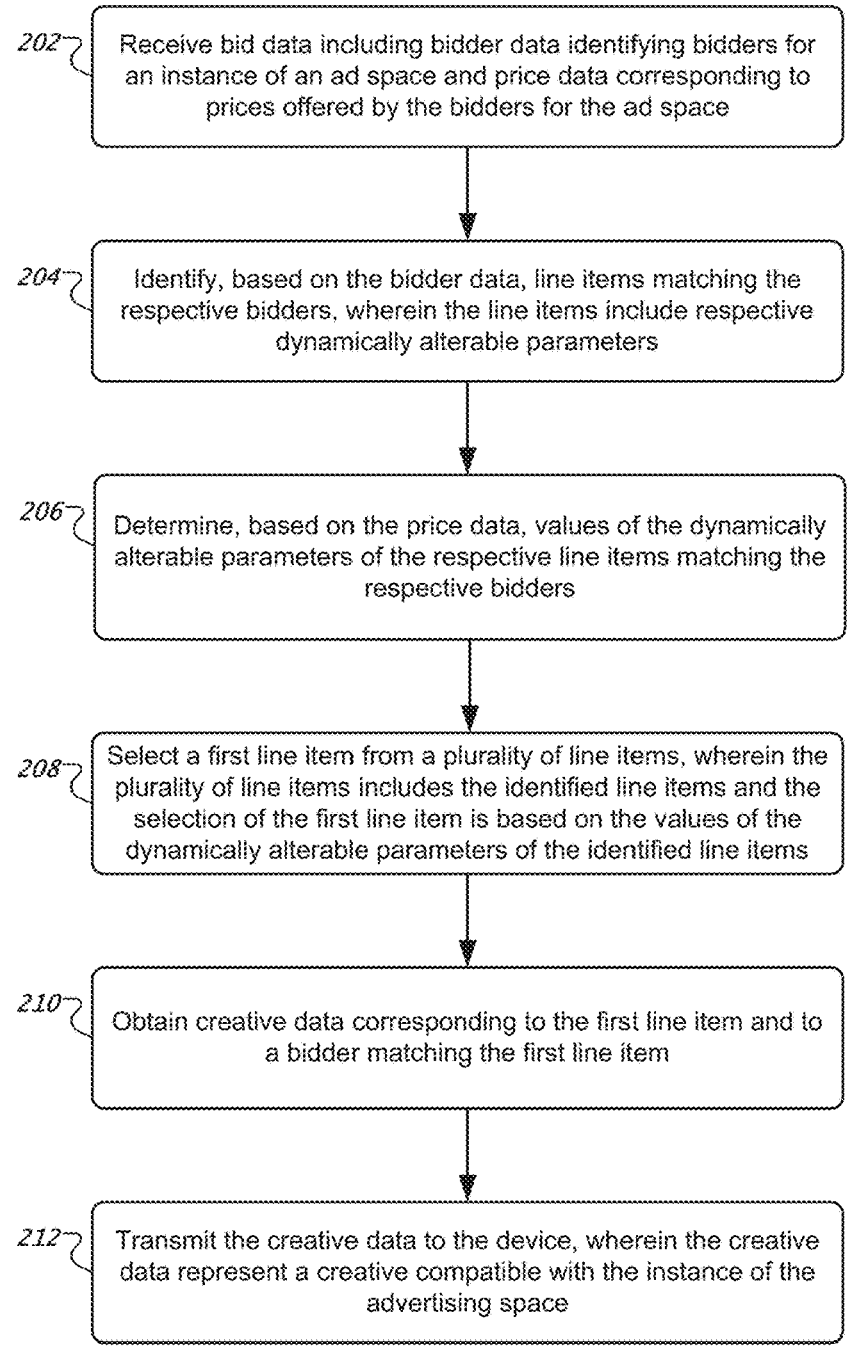
FIG. 2 is a flowchart of a method for allocating ad space inventory, according to some embodiments.

FIG. 2 illustrates a method 200 for allocating ad space inventory, according to some embodiments. The method can be implemented using software components executing on one or more data processing apparatus that are part of the data center 121 described earlier. For instance, the method can be implemented using the allocation manager 111.

In step 202 of the method 200, bid data is received (e.g., by a server system 122 or by an allocation manager 111). The bid data can include bidder data (e.g., bidder identifiers) identifying pre-bidders for an instance of an ad space. The bid data can include price data corresponding to prices offered by the bidders for the ad space. The bid data can include creative data (e.g., creatives or URLs corresponding to creatives), which can be used to serve the bidders' creatives. In some embodiments, the bid data represents one or more bids received from pre-bidders (e.g., during a client-side auction). In some embodiments, the bid data is received in connection with a request (an ad request) to provide a creative to fill an instance of an ad space. In some embodiments, the bid data is included in an ad tag used by a client device 120 to send the ad request to the server system 122 or the allocation manager 111. For example, the bid data can be inserted in a query string of an ad tag URL.

In some embodiments, the price data is represented by a number corresponding to a currency value (e.g., an integer 120 or a real number 1.20 can represent a price of $1.20). The price may be expressed in CPM, CPC, CPA, or any other suitable pricing model. In some embodiments, the price data is encoded (e.g., each price can be encoded as a corresponding ASCII character string).

In step 204 of the method 200, one or more line items matching the bidder data are identified. In some embodiments, the matching line items are pre-bid line items. In some embodiments, the matching line items are identified by searching the line item data database 139 for line items of the pre-bid type with buyer parameter values matching the bidder identifiers. In some embodiments, the matching line items include one or more dynamically alterable parameters. The dynamically alterable parameters can include, for example, price parameters, priority parameters, and/or creative parameters. The value of a line item's creative parameter can be a creative to be served when an ad space is allocated to the line item, or a URL corresponding to a creative to be served when an ad space is allocated to the line item.

In step 206 of the method 200, the values of dynamically alterable parameters of the line items are determined. In some embodiments, the price parameter of each matching line items is set based on the price data received in step 202. For example, the value of the price parameter of a pre-bid line item matching a particular bidder can be set to the price (or price tier) offered by that bidder for the ad space. In some embodiments, the priority parameter of each matching line item is set based on the price data and/or the bidder data received in step 202. For example, the value of the priority parameter of a pre-bid line item matching a particular bidder can be set based on the bidder's identity, the price offered by the bidder, and/or any other suitable information. In some embodiments, the creative parameter of each matching line item is set based on the creative data received in step 202. For example, the value of the creative parameter of a pre-bid line item matching a particular bidder can be set to the creative data provided with the bidder's pre-bid.

In some embodiments, method 200 further includes a step (not shown) in which one or more ad campaign line items matching the ad request are identified. The matching ad campaign line items can be identified by searching the line item data database 139 for line items of the ad campaign type having parameter values that match some or all of the data associated with the instance of the ad space. The matching ad campaign line items can be identified before the pre-bid line items are identified, after the pre-bid line items are identified, or in parallel with the identification of the pre-bid line items.

In step 208 of the method 200, a line item is selected from a plurality of line items, and the instance of the ad space is allocated to the selected line item. The plurality of line items includes the matching pre-bid line items. In some embodiments, the plurality of line items further includes any matching ad campaign line items. In some embodiments, the selection of the line item is based, at least in part, on the dynamically alterable parameters of the pre-bid line items. For example, the selection of the line item can be based, at least in part, on the values of the price parameters and/or priority parameters of the pre-bid line items. In some embodiments, price parameter values of the matching line items are compared, and the matching line item with the highest price parameter value (or second highest price parameter value) is selected. In some embodiments, priority parameter values of the matching line items are compared, and the matching line item with the highest priority is selected.

In step 210 of the method 200, creative data corresponding to the selected line item and the bidder matching the selected line item are obtained. In some embodiments, the selected line item's creative data has already been stored in the line item's creative parameter, and can be obtained by loading the line item's creative parameter. In some embodiments, the selected line item's creative data is obtained by communicating with the bidder corresponding to the selected line item (e.g., via network 113).

In step 212 of the method 200, the creative data is transmitted to the device that sent the ad request. The creative represented by the creative data is compatible with the instance of the ad space to which the ad request pertains. The device can display the creative in the ad space.

Figure 3:
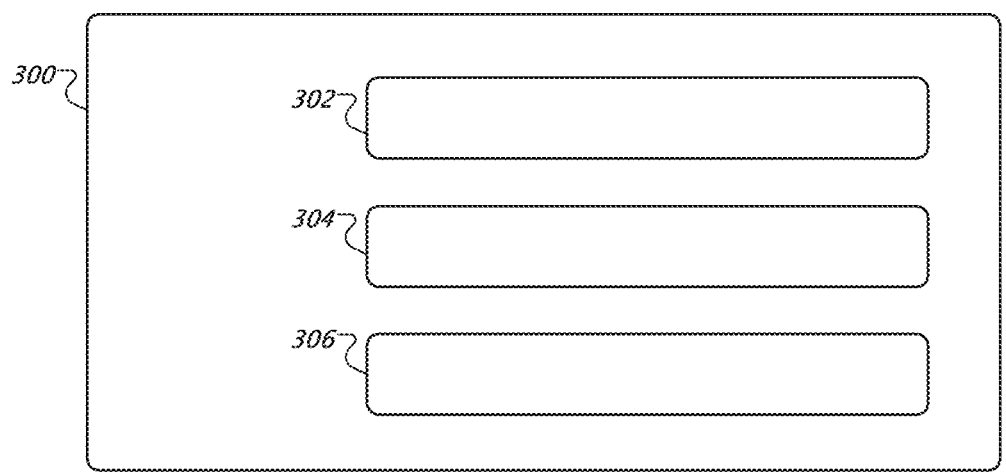
FIG. 3 is a block diagram of a user interface for configuring line items, according to some embodiments.

FIG. 3 shows a block diagram of a user interface 300 for configuring line items, according to some embodiments. In some embodiments, the user interface 300 is displayed to a user (e.g., ad space inventory seller or buyer) as part of a web page provided by transaction manager 111 (e.g., via network 113). Through the user interface 300, the user can create one or more line items or configure existing line items (e.g., by specifying values of the line item parameters). The created or configured line items can be stored, for example, in line item data database 139.

In some embodiments, the user interface 300 includes an input element 302 adapted to receive input identifying a purchaser associated with the line item. The input element 302 may be, for example, a text input field or a select menu (e.g., a drop-down select menu). Other input elements are possible. The user can specify a purchaser by, for example, inputting the purchaser's name or the purchaser's identifier. The purchaser identifier corresponding to the identified purchaser is then stored in the line item's "buyer identifier" parameter.

In some embodiments, the user interface 300 includes an input element 304 adapted to receive input indicating that a price parameter of the line item is dynamically alterable. As described above, the value of a line item's price parameter can represent a price offered by a prospective purchaser for an instance of an advertising space. In some embodiments, the input element 304 may include, for example, a text input field, radio buttons, a check box, or a select menu (e.g., a drop-down select menu). In some embodiments, a user can indicate that a price parameter of the line item is dynamically alterable by providing input indicating that the line item is a pre-bid line item (e.g., by typing "pre-bid" in a text input field, selecting a "pre-bid" radio button or check box, or selecting "pre-bid" in a select menu). In some embodiments, a user can indicate that a price parameter of the line item is dynamically alterable by selecting a suitable radio button, check box, or menu item associated with a price parameter input element.

In some embodiments, the user interface 300 includes at least one additional input element 306. In some embodiments, the input element 306 is adapted to receive input indicating that a priority parameter of the line item is dynamically alterable. In some embodiments, the input element 306 is adapted to receive input identifying one or more sets of dimensions for advertising spaces matching the line item. In some embodiments, the input element 306 is adapted to receive input specifying one or more targeting criteria for instances of advertising spaces matching the line item.

Some embodiments have been described in which an allocation manager 111 is used in connection with a transaction manager 112, which conducts real-time auctions. In some embodiments, allocation manager 111 is used without transaction manager 112 (e.g., in connection with an ad server, ad network, or ad exchange that does not conduct real-time auctions). In some embodiments, allocation manager 111 is included in ad server 127.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. An online advertising method, comprising:
   receiving, over a network by a processing system comprising one or more computers, bid data from an end user device, the bid data including bidder data, price parameters, and priority parameters, wherein the bidder data identifies bidders for an instance of an advertising space, wherein the price parameters correspond to prices offered by the respective bidders for the instance of the advertising space, wherein the priority parameters correspond to priority of a particular line item of a particular bidder as compared to other line items of the particular bidder associated with the respective bidders for the instance of the advertising space, wherein the bid data are derived, at least in part, from a client-side auction that is initiated during loading of a file by the end user device, wherein the receiving the bid data comprises receiving a uniform resource locator (URL) comprising the bid data, and wherein a query string of the URL includes key-value pairs inserted by the end user device representing identifications of the bidders and the corresponding prices offered;
   parsing, by the processing system, the query string;
   identifying, by the processing system based at least in part on the bidder data, line items matching the respective bidders resulting in identified line items, wherein the identified line items include respective dynamically alterable parameters, and wherein the identified line items are stored in a line item database;
   determining, by the processing system based at least in part on the price parameters and the priority parameters, values of the dynamically alterable parameters of the respective identified line items matching the respective bidders for the instance of the advertising space;
   adjusting, by the processing system, the price parameters and the priority parameters for the identified line items, stored in the line item database, to include the determined values derived, at least in part, from the client-side auction of the dynamically alterable parameters of the respective identified line items matching the respective bidders for the instance of the advertising space;
   determining a winning bid by selecting, by the processing system, a first line item from a plurality of line items stored in the line item database according to an analysis of the plurality of line items and a determination that the first line item matches an ad request associated with the instance of the advertising space, wherein the plurality of line items includes the identified line items that have been adjusted based on the bid data that is derived, at least in part, from the client-side auction, and wherein the selection of the first line item is based at least in part on the values of the dynamically alterable parameters of the identified line items;
   obtaining, by the processing system, creative data corresponding to the first line item and to a bidder matching the first line item; and
   transmitting, by the processing system, the creative data to the end user device, wherein the creative data represent a creative compatible with the instance of the advertising space.

2. The method of claim 1, wherein the bid data are first bid data, wherein the instance of the advertising space is a first instance of the advertising space, wherein the values of the dynamically alterable parameters are first values, and wherein the method further comprises:
   receiving, by the processing system from a second device, second bid data of the same bidders for a second instance of the advertising space;
   identifying, by the processing system, the same line items matching the respective bidders;
   determining, by the processing system, second values of the parameters of the line items based at least in part on the second bid data;
   selecting, by the processing system, a second of the identified line items based at least in part on the second values of the parameters of the identified line items; and
   transmitting, by the processing system, to the second device, second creative data representing a second creative corresponding to the second line item and to a second bidder matching the second line item.

3. The method of claim 1, wherein the bid data are first bid data, wherein the instance of the advertising space is a first instance of the advertising space, wherein the values of the dynamically alterable parameters are first values, wherein the end user device is a first device, and wherein the method further comprises:
   receiving, by the processing system, second bid data from a second device, the second bid data including bidder data identifying the bidders and second price data corresponding to second prices offered by the respective bidders for a second instance of the advertising space;

identifying, by the processing system, based at least in part on the second bid data, the line items matching the respective bidders;

determining, by the processing system, based at least in part on the second price data, second values of the dynamically alterable parameters of the respective line items matching the respective bidders for the second instance of the advertising space;

selecting, by the processing system, a second line item from a second plurality of line items, wherein the second plurality of line items includes the identified line items, and wherein the selection of the second line item is based at least in part on the second values of the dynamically alterable parameters of the identified line items;

obtaining, by the processing system, second creative data corresponding to the second line item and to a second bidder matching the second line item; and transmitting, by the processing system, the second creative data to the second device, wherein the second creative data represent a second creative compatible with the second instance of the advertising space.

4. The method of claim 1, wherein the loading of the file comprises loading of an HTML file by the end user device.

5. The method of claim 1, further comprising:
determining a price value for the instance of the advertising space.

6. The method of claim 5, further comprising determining that the values of the dynamically alterable parameters of the respective identified line items matching the respective bidders are less than the price value.

7. The method of claim 6, further comprising responsive to the determining that the values of the dynamically alterable parameters are less than the price value, initiating a server-side auction, wherein the plurality of line items that are analyzed to determine the winning bid includes one or more other line items associated with one or more other bidders obtained from the server-side auction.

8. The method of claim 1, wherein contextual data is received from the end user device.

9. The method of claim 8, wherein the loading of the file is associated with a gaming application being executed by the end user device.

10. The method of claim 1, wherein the transmitting the creative data to the end user device comprises transmitting the creative or a location of the creative to the end user device.

11. The method of claim 1, wherein a location of the creative is represented by a URL.

12. The method of claim 1, wherein the plurality of line items includes at least one of targeting information, pacing information, or budget constraints.

13. The method of claim 1, wherein the end user device is a mobile device.

14. An ad server, comprising:
a processing system including a processor; and
a memory that stores executable instructions that, when executed by the processing system, facilitate performance of operations, comprising:
receiving bid data over a network from an end user device, the bid data including bidder data, price parameters, and priority parameters, wherein the bidder data identifies bidders for an instance of an advertising space, wherein the price parameters correspond to prices offered by the respective bidders for the instance of the advertising space, wherein the priority parameters correspond to priority of a particular line item of a particular bidder as compared to other line items of the particular bidder associated with the respective bidders for the instance of the advertising space, wherein the bid data are derived, at least in part, from a client-side auction that is initiated during loading of a file by the end user device, wherein the receiving the bid data comprises receiving a uniform resource locator (URL) comprising the bid data, and wherein a query string of the URL includes key-value pairs inserted by the end user device representing identifications of the bidders and the corresponding prices offered;

parsing the query string;

identifying, based at least in part on the bidder data, line items matching the respective bidders resulting in identified line items, wherein the identified line items include respective dynamically alterable parameters, and wherein the identified line items are stored in a line item database;

determining, based at least in part on the price parameters and the priority parameters, values of the dynamically alterable parameters of the respective identified line items matching the respective bidders for the instance of the advertising space;

adjusting the price parameters and the priority parameters for the identified line items, stored in the line item database, to include the determined values derived, at least in part, from the client-side auction of the dynamically alterable parameters of the respective identified line items matching the respective bidders for the instance of the advertising space;

determining a winning bid by selecting a first line item from a plurality of line items stored in the line item database according to an analysis of the plurality of line items and a determination that the first line item matches an ad request associated with the instance of the advertising space, wherein the plurality of line items includes the identified line items that have been adjusted based on the bid data that is derived, at least in part, from the client-side auction, and wherein the selection of the first line item is based at least in part on the values of the dynamically alterable parameters of the identified line items;

obtaining creative data corresponding to the first line item and to a bidder matching the first line item; and transmitting the creative data to the end user device, wherein the creative data represent a creative compatible with the instance of the advertising space.

15. The ad server of claim 14, wherein the bid data are first bid data, wherein the instance of the advertising space is a first instance of the advertising space, wherein the values of the dynamically alterable parameters are first values, and wherein the operations further include:
receiving, from a second device, second bid data of the same bidders for a second instance of the advertising space;

identifying the same line items matching the respective bidders;

determining second values of the parameters of the line items based at least in part on the second bid data; and selecting a second of the identified line items based at least in part on the second values of the parameters of the identified line items;

transmitting, to the second device, second creative data representing a second creative corresponding to the second line item and to a second bidder matching the second line item.

16. The ad server of claim 14, wherein the bid data are first bid data, wherein the instance of the advertising space is a first instance of the advertising space, wherein the values of the dynamically alterable parameters are first values, wherein the end user device is a first device, and wherein the operations further include:
   receiving second bid data from a second device, the second bid data including bidder data identifying the bidders and second price data corresponding to second prices offered by the respective bidders for a second instance of the advertising space;
   identifying, based at least in part on the second bid data, the line items matching the respective bidders;
   determining, based at least in part on the second price data, second values of the dynamically alterable parameters of the respective line items matching the respective bidders for the second instance of the advertising space;
   selecting a second line item from a second plurality of line items, wherein the second plurality of line items includes the identified line items, and wherein the selection of the second line item is based at least in part on the second values of the dynamically alterable parameters of the identified line items;
   obtaining second creative data corresponding to the second line item and to a second bidder matching the second line item; and
   transmitting the second creative data to the second device, wherein the second creative data represent a second creative compatible with the second instance of the advertising space.

17. The ad server of claim 14, wherein the loading of the file comprises loading of an HTML file by the end user device.

18. The ad server of claim 14, wherein each of the plurality of line items matches the instance of the advertising space.

19. The ad server of claim 14, wherein the operations further comprise determining a price value for the instance of the advertising space.

20. The ad server of claim 19, wherein the operations further comprise:
   determining that the values of the dynamically alterable parameters of the respective identified line items matching the respective bidders are less than the price value; and
   responsive to the determining that the values of the dynamically alterable parameters are less than the price value, initiating a server-side auction, wherein the plurality of line items that are analyzed to determine the winning bid includes one or more other line items associated with one or more other bidders obtained from the server-side auction.

21. The ad server of claim 14, wherein contextual data is received from the end user device.

22. The ad server of claim 21, wherein the loading of the file is associated with a gaming application being executed by the end user device.

23. The ad server of claim 14, wherein transmitting the creative data to the end user device comprises transmitting the creative or a location of the creative to the end user device.

24. The ad server of claim 14, wherein a location of the creative is represented by a URL.

25. The ad server of claim 14, wherein the plurality of line items includes at least one of targeting information, pacing information, or budget constraints.

26. The ad server of claim 14, wherein the end user device is a mobile device.

27. A non-transitory computer-readable storage medium, comprising executable instructions that, when executed by a processing system including a processor, facilitate performance of operations, the operations comprising:
   receiving bid data over a network from an end user device, the bid data including bidder data, price parameters, and priority parameters, wherein the bidder data identifies bidders for an instance of an advertising space, wherein the price parameters correspond to prices offered by the respective bidders for the instance of the advertising space, wherein the priority parameters correspond to priority of a particular line item of a particular bidder as compared to other line items of the particular bidder associated with the respective bidders for the instance of the advertising space, wherein the bid data are derived, at least in part, from a client-side auction that is initiated during loading of a file by the end user device, wherein the receiving the bid data comprises receiving a uniform resource locator (URL) comprising the bid data, and wherein a query string of the URL includes key-value pairs inserted by the end user device representing identifications of the bidders and the corresponding prices offered;
   parsing the query string;
   identifying, based at least in part on the bidder data, line items matching the respective bidders resulting in identified line items, wherein the identified line items include respective dynamically alterable parameters, and wherein the identified line items are stored in a line item database;
   determining, based at least in part on the price parameters and the priority parameters, values of the dynamically alterable parameters of the respective identified line items matching the respective bidders for the instance of the advertising space;
   adjusting the price parameters and the priority parameters for the identified line items, stored in the line item database, to include the determined values derived, at least in part, from the client-side auction of the dynamically alterable parameters of the respective identified line items matching the respective bidders for the instance of the advertising space;
   determining a winning bid by selecting a first line item from a plurality of line items stored in the line item database according to an analysis of the plurality of line items and a determination that the first line item matches an ad request associated with the instance of the advertising space, wherein the plurality of line items includes the identified line items that have been adjusted based on the bid data that is derived, at least in part, from the client-side auction, and wherein the selection of the first line item is based at least in part on the values of the dynamically alterable parameters of the identified line items;
   obtaining creative data corresponding to the first line item and to a bidder matching the first line item; and
   transmitting the creative data to the end user device, wherein the creative data represent a creative compatible with the instance of the advertising space.

* * * * *